United States Patent Office 3,359,185
Patented Dec. 19, 1967

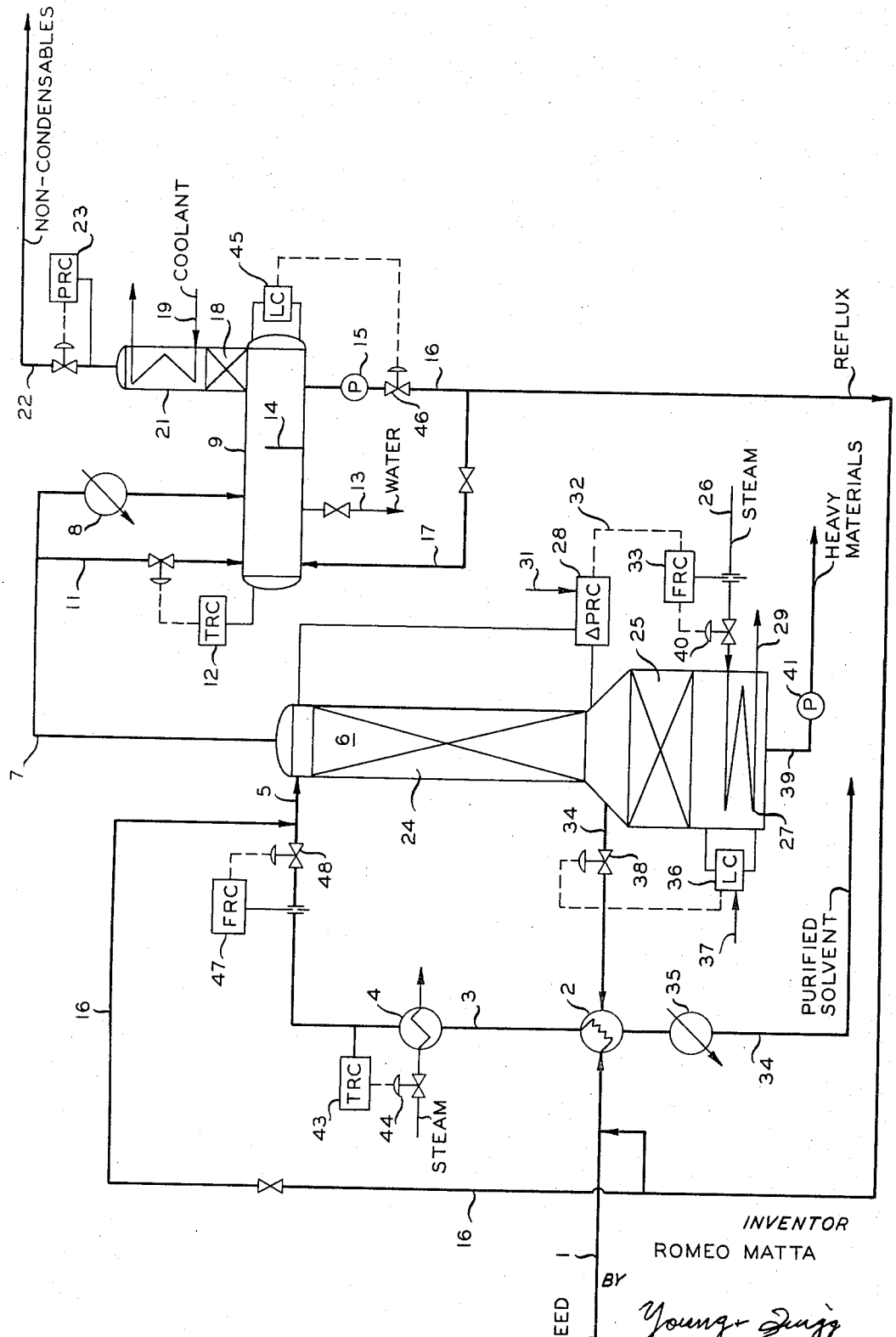

3,359,185
PROCESS AND APPARATUS FOR A DISTILLATION SYSTEM PROVIDING LIQUID LEVEL AND DIFFERENTIAL PRESSURE CONTROLS
Romeo Matta, Bartlesville, Okla., assignor to Phillips Petroleum Company, a corporation of Delaware
Filed Dec. 23, 1965, Ser. No. 516,015
5 Claims. (Cl. 203—1)

This invention relates to recovery of streams by distillation. In one of its aspects, the invention relates to the recovery of several streams from a feed by distillation of the feed in a single distillation zone or column by feeding said feed into an upper portion of said column or zone and obtaining from said zone an overhead vapor, and from a point below the point of feed to said zone, obtaining a fluid sidestream and, from a bottom portion of said zone obtaining a liquid kettle product. In another of its aspects, as it relates to a specific embodiment of the invention in connection with which it is later described, the invention recovers a chemical ingredient, such as an antioxidant and/or a short-stopping agent of lesser volatility, from a diluent used in catalytic polymerization, normal hexane in the specific embodiment, by feeding to the distillation zone set out herein a feed stream containing water, the chemical ingredient or agent and normal hexane and separating the feed in the column into an overhead vapor stream containing water and some hexane, thus dehydrating the diluent, removing from a mid-portion of the column below the point of feed, a dehydrated normal hexane vapor sidestream and, from the bottom of the column, a liquid stream containing some normal hexane and the said agent. In a further aspect of the invention, still as it may be viewed in connection with the specific embodiment set out herein, the overhead vapors which contain the water and a portion of the normal hexane are passed to a condensing section or zone and therefrom to an accumulator in which the condensed water phase is removed and the hydrocarbon phase recovered and returned to the distillation zone while non-condensed vapor is vented in a manner and at a rate sufficient to maintain the distillation pressure at a desired value. In a further aspect of the invention, the heat requisite for the distillation is transmitted to the distillation zone, still as viewed in connection with the specific embodiment set out herein, by a heating means controlled responsive to the pressure differential in the distillation zone or column determined across a portion thereof located substantially above the vaporous solvent side stream removal level. In a still further aspect, a packed section is used in the top portion of the distillation zone or column, and the pressure differential is measured across the packed section. In a still further aspect, the invention relates to a process as hereinbefore set forth wherein the flow of bottoms from the distillation zone or column is removed at a constant rate and the rate of fluid solvent side stream removal is controlled according to the level of liquid in the bottom of the distillation zone or column.

In the copending application of Jones, Ser. No. 421,158, filed Dec. 24, 1964, there is described and claimed a method for purifying a feed material containing at least two vaporizable components and a relatively non-vaporizable component. In such an application, a low boiling vaporous fraction is removed from the overhead of a distillation column, a higher boiling vaporous product is removed as a vaporous side stream from the distillation column and the relatively non-vaporizable component is removed as a liquid product from the bottom of the column. Heat is supplied to the bottom of the column in accordance with a differential pressure sensed across the portion between the top of the column and an intermediate level of the column. Further, the rate of liquid withdrawal from the column is controlled according to the level of liquid in the bottom of the column. I have now discovered, quite unexpectedly, that the process and apparatus of the invention in Ser. No. 421,158 can be operated at maximum throughput close to its flooding point by removing the liquid from the bottom of the column at a constant rate and by controlling the rate of side stream vapor draw off responsive to the level of liquid in the bottom of the fractionator.

By various aspects of this invention, one or more of the following, or other, objects can be obtained.

It is an object of this invention to provide an improvement in the process of treatment of a solvent stream wherein higher volatility and lower volatility constituents are removed therefrom. It is a further object of this invention to provide an improved process and apparatus for operating a fractionation column near its flooding point to maximize throughput.

It is an object of this invention to provide for the recovery of certain streams from a feed by a distillation operation. It is another object of this invention to provide for the distillation treatment of solvents and/or diluents. It is a further object of this invention to provide a method and/or an apparatus for recovery of chemical agents, such as inhibitors or reaction-arresting ingredients, from a solvent employed in catalytic reactions. It is a still further object of the invention to provide a method and/or an apparatus wherein solvents used in the polymerization of compounds to form plastics or synthetic rubber can be effectively treated to recover therefrom components which are undesirable in the reaction zone and which, if not recovered, would be returned to the reaction zone when the solvent is reused for further production of desired product. Yet another object of the invention is to provide apparatus means, including control means, for the automatic operation of a solvent treating and recovery system.

Other aspects, objects, and the several advantages of this invention will become apparent from a study of this disclosure, the drawing and the appended claims.

According to the present invention, there is provided a method for the distillation of a feed material containing at least two vaporizable components and a relatively non-vaporizable component which comprises feeding said material to an upper portion of a distillation column, taking overhead a vapor stream from said column containing substantially all of one of said two vaporizable components and a portion of at least one other of said vaporizable components, taking from an intermediate portion of said column below the location of the feed inlet to said column a fluid stream of said at least one other of said vaporizable components, and withdrawing from the bottom of said column a liquid stream containing said relatively non-vaporizable component.

In a preferred embodiment of the invention, the pressure differential desired across the upper portion of the distillation column is predetermined and heat is supplied to the column in accordance with the desired and actual values of this pressure differential. Further, the rate of withdrawal of liquid from the bottom of said column is maintained substantially constant and the rate of withdrawal of said fluid stream from the intermediate portion of the column is controlled according to the level of liquid in the bottom portion of the column.

The invention will be described with reference to the accompanying drawing which shows an embodiment of the invention in which a normal hexane solvent containing primarily water and 2,6-di-tertiarybutyl-4-methylphenol is treated in a single distillation zone by distillation to recover dehydrated, purified solvent suitable for reuse in the polymerization of one or several monomers in the production of a synthetic rubber.

Referring now to the drawing, used hexane solvent feed is passed by conduit 1 through heat exchanger 2, conduit 3 and heat exchanger 4 and, finally, by conduit 5 into column 6. Water vapor and some hexane vapor are removed as overhead vapor and are passed by conduit 7 through heat exchanger-condenser-cooler 8 as essentially all liquid to accumulator 9. A portion of the overhead vapor is bypassed by conduit 11, controlled by temperature recorder-controller 12, to condense in and thereby to maintain a desired temperature in accumulator 9.

In accumulator 9, a liquid water phase is separated and removed by way of water drain conduit 13, as shown, and thus from the system. Hydrocarbon phase is decanted over weir 14 in the accumulator and is pumped by pump 15 through conduit 16 into admixture with the feed to column 6, preferably in conduit 1 but also in conduit 5 if so desired. A portion of this hydrocarbon phase may be pumped by conduit 17 back to accumulator 9 as desired. Non-condensables are removed through packing 18 and condenser 19 of knock-back zone 21. The flow of non-condensables through discharge conduit 22 is regulated by pressure recorder-controller 23 which senses the pressure in zone 21 and accumulator 9.

Preferably, column 6 comprises a tower with an upper section and a lower section which may be of different sizes. As shown in the drawing, the upper section, which has a smaller diameter than the lower section, contains packing section 24. The lower section of the fractionator contains packing section 25.

Reboiling heat is supplied to column 6 by way of conduit 26 and heating coil 27, to which steam is fed responsive to the pressure differential across packed section 24 as determined and regulated by differential pressure recorder-controller 28, the steam condensate having been removed by conduit 29. Recorder-controller 28 operates upon the differential pressure sensed between the top portion of the column (principally comprising packed section 24) and the point of removal of vaporous solvent as a side stream through conduit 34. The vaporous solvent removed via conduit 34 is heat exchanged with the feed in heat exchanger 2 and is then passed by 34 through water cooler 35 and removed from the system purified for reuse as desired. According to the invention, the liquid level in the kettle of column 6 is maintained by way of liquid level controller 36 operative upon valve 38 in line 34 to control the rate of vaporous product removal in accordance with level set point 37. All of the 2,6-di-tertiarybutyl-4-methylphenol and other low volatility components are recovered in the bottoms passing from the system by line 39 through metering pump 41 and line 39. Thus, the bottoms product from the column is removed at a desired constant rate. To regulate the temperature of the column's feed stream, temperature recorder-controller 43 which senses the temperature in conduit 5 is employed to operate valve 44 to achieve the desired temperature. To regulate feed rate to the column in the face of flow disturbances due to the accumulator level regulating actions of controller 45 and valve 46, flow recorder-controller 47 and valve 48 are provided. The relative "loading" of the upper section of fractionator 6, due to the countercurrent contact and passage of liquid and vapor therein, is measured by means of the pressure differential across this section. This valve is used as the measurement to controller 28, which also receives, as set point 31, the desired value of this differential pressure so as to provide a control signal 32 related to the difference therebetween. Signal 32 is applied as the set point to a conventional flow control loop comprised of a flow recorder controller and measuring element 33 and control valve 40 on steam conduit 26 as shown.

Thus, by operation of the invention, feed is fed at a constant rate to a fractionation column, bottoms are removed from the fractionation column at a constant rate, and the column is operated at maximum throughput near flooding conditions by controlling the heat supplied to the bottom of the column in accordance with a differential pressure sensed by 28 across packing column 24 and controlling the rate of a vapor side draw through line 34 in accordance with the liquid level in the bottom of the column.

An example of how the invention works to provide a stream of purified recycle normal hexane solvent for a catalytic polymerization process, wherein a relatively low concentration (less than 0.01 weight percent) of heavy impurities such as polymer antioxidant, catalyst deactivating agent, non-reactive impurities from the monomer streams, etc., and only a trace (less than 10 parts per million) of water, are tolerable in the reactor, is given by the following table and description.

MATERIAL BALANCE—POUNDS PER DAY

| Stream Component | Feed 1 | Reflux 16 | Combined Feed 5 | Non-Condensables 22 | Water 13 | Purified Solvent 34 | Bottoms Prod. 39 |
|---|---|---|---|---|---|---|---|
| Acetylenes | 1 | 19 | 20 | 1 | | | |
| Butylenes | 95 | 2,150 | 2,245 | 95 | | | |
| n-Hexane | 446,327 | 83,140 | 529,467 | 1,200 | 1 | 440,986 | 4,140 |
| Heavy Impurities | 152 | | 152 | | | 36 | 116 |
| Water | 356 | 68 | 424 | 13 | 343 | Trace | |
| | 446,931 | 85,377 | 532,308 | 1,309 | 344 | 444,022 | 4,256 |
| Temperature, °F.[1] | 100 | 140 | 175 | 120 | 140 | 177 | 178 |
| Pressure, p.s.i.g.[1] | 30 | 3 | 10 | 3 | 3 | 14 | 15 |

[1] Conditions existing at junction of column and conduit, except for conduit #1.

Since, by this inventive control method, the numerous process streams are carefully controlled to the desired (set point) conditions by means of controllers 43, 47, 12, 23, 45, 28, 33 and 37, and by the manually adjustable flow rate produced by constant flow rate pump 41, the system is substantially self controlled to perform the desired physical separations. If substantial, ordered changes in feed rate are applied to the set point of controller 47, and/or if changes in the concentrations of heavy impurities and/or water in feed stream 1 are noted, readjustment (1) of the set point 31 to controller 28 and/or (2) of the pumping capacity of pump 41 is made to provide (1) the adequate stripping vapor from reboiler coil 27 to volatilize the water contained in the combined feed stream into overhead vapor stream 7 (for ultimate removal as stream 13) and/or (2) an altered withdrawal rate of heavy impurities as stream 39. Other column controllers, sensing the changed flow, level, etc., conditions within the system will automatically readjust their material and energy flow rates to realize essentially steady operation of the process.

While readjustments of process set points are usually made on the basis of laboratory analysis of impurities and water in the purified solvent, it will be obvious to one skilled in the art that feedback control of set point 31 of different pressure controller 28 may be exercised from an analyzer-controller, measuring and controlling water concentration in stream 34 may be exercised. Similarly, if on-stream analysis of heavy impurities concentration in stream 34 is performed, analysis-based feedback control of the pumping capacity of pump 41 may be exercised and thereby the flow rate of bottom product 39 may be automated.

Likewise, automatic interfacial level control may be utilized to regulate the rate of free water phase withdrawal by line 13 from accumulator 9 as is well known in the art.

In a system as afore-described with reference to the drawing, the bottoms product is relatively small as compared to the side draw fraction. In such a system, it is highly impracticable if not impossible to control the column level by manipulating the bottom stream flow rate. Thus, the invention provides a method for controlling a column to an improved degree when the flow rate of liquid withdrawn from the bottom of the column is relatively small compared with the flow rate of product withdrawn as a vapor from the side of the column.

Reasonable variation and modification are possible within the scope of the foregoing disclosure, the drawing and the appended claims to the invention, the essence of which is that there is provided a process and apparatus for purifying a stream of liquid containing at least two vaporizable components and a relatively non-volatile component, the process comprising feeding said stream to a top portion of the fractionation column, removing as overhead vapor essentially all of one of the vaporizable components, and a portion of the other, removing as a liquid from the bottom of the column essentially all of the relatively non-volatile component and a portion of the other vaporizable component, removing from the column as a fluid side draw stream substantially purified other vaporizable component, supplying heat to the bottom portion of the column in accordance with a differential pressure sensed across a top portion of the column, removing liquid from the bottom of the column at a fixed rate, and controlling the rate of fluid side draw in accordance with the level of liquid in the bottom of the column.

I claim:

1. A method for the purification of a normally liquid material containing a low boiling component and a high boiling component comprising feeding said liquid containing said low and high boiling components to the upper portion of a distillation column, removing vaporous overhead containing said boiling component, removing from a central portion of said column a vaporous side draw stream containing substantially pure said normally liquid material, collecting said high boiling component as a liquid product in the bottom of said column, removing said liquid from the bottom of said distillation column at a constant rate, sensing differential pressure between the upper and central portion of said column, supplying heat to the lower portion of said column in accordance with said sensed pressure differential to maintain a predetermined differential pressure, sensing the level of liquid in the bottom of said column, and adjusting the rate of withdrawal of said vaporous normally liquid material in accordance with the liquid level to maintain a predetermined level of liquid in the bottom of said column.

2. A method according to claim 1 wherein said differential pressure is sensed across a packed column which is located in the upper portion of said column between said vapor draw of said substantially pure normally liquid material and said overhead withdrawal.

3. A method according to claim 2 wherein a portion of said overhead vapor is cooled, condensed, and passed to a separator-collector vessel, wherein said low boiling component is removed as a liquid product, non-condensables are removed responsive to pressure in a locus of said non-condensable removal zone, normally liquid material, unavoidably entrained in said overhead is removed from said separator-collector vessel and returned to the column, admixed with said feed.

4. A method according to claim 1 wherein said normally liquid material is normal hexane, and said feed is derived from and reused in the polymerization of monomer or comonomers in the production of synthetic rubber.

5. An apparatus for the purification of a solvent feed comprising
  (a) a distillation column containing an upper portion having a packing section therein, a central portion, and a lower portion having a packing section therein,
  (b) means for feeding said solvent containing impurities to the upper portion of said column,
  (c) means for withdrawing a vaporous overhead product from the upper portion of said column,
  (d) means for withdrawing a vaporous product from the central portion of the column,
  (e) means for removing from the bottom of said column a liquid product at a constant rate,
  (f) means for heating liquid in the bottom portion of said column,
  (g) means for sensing the differential pressure across said packing section in the top portion of said column,
  (h) means for adjusting the heat supplied to said bottom portion of said column in accordance with the differential pressure sensed across said packing section in the top portion of said column,
  (i) means for sensing the level of liquid in the bottom of said column, and
  (j) means for controlling the rate of product withdrawal from the central portion of said column in accordance with the sensed liquid level.

References Cited

UNITED STATES PATENTS

| | | | |
|---|---|---|---|
| 2,232,840 | 2/1941 | Claffey | 202—160 |
| 2,882,693 | 4/1959 | Clay | 202—160 |
| 2,990,341 | 6/1961 | Graybill | 203—86 |
| 3,130,027 | 4/1964 | Harper | 62—37 |
| 3,136,706 | 6/1964 | Harper | 196—132 |
| 3,225,550 | 12/1965 | Kelley et al. | 203—1 |
| 3,249,519 | 5/1966 | Cabbage et al. | 203—2 |
| 3,259,554 | 7/1966 | Constantikes | 62—21 |
| 3,287,344 | 11/1966 | Strobel | 260—94.7 |
| 3,309,882 | 3/1967 | Cabanaw | 62—21 |

NORMAN YUDKOFF, Primary Examiner.

WILBUR L. BASCOMB, JR., Examiner.

UNITED STATES PATENT OFFICE
CERTIFICATE OF CORRECTION

Patent No. 3,359,185                          December 19, 1967

Romeo Matta

It is hereby certified that error appears in the above numbered patent requiring correction and that the said Letters Patent should read as corrected below.

Column 5, line 51, after "said" insert -- low --.

Signed and sealed this 18th day of February 1969.

(SEAL)
Attest:

Edward M. Fletcher, Jr.                           EDWARD J. BRENNER
Attesting Officer                                    Commissioner of Patents